United States Patent [19]

Erickson

[11] 4,418,678
[45] Dec. 6, 1983

[54] INSULATED BARBEQUE UNIT

[75] Inventor: Frederick J. Erickson, Des Moines, Iowa

[73] Assignee: Ehco, Inc., De Moines, Iowa

[21] Appl. No.: 321,741

[22] Filed: Nov. 16, 1981

[51] Int. Cl.³ .......................... A47J 37/00; F24C 1/16
[52] U.S. Cl. ................................... 126/9 R; 126/25 R
[58] Field of Search ...................... 126/9 R, 9 B, 25 R, 126/25 A, 25 C, 451, 25 B; 99/449, 450, 339, 340

[56] References Cited

U.S. PATENT DOCUMENTS

| 2,349,617 | 5/1944 | Gorman | 126/25 R |
| 2,552,861 | 5/1951 | Overman | 126/25 R |
| 2,556,365 | 6/1951 | McKnight | 126/9 R |
| 2,792,773 | 5/1957 | Barker | 126/9 R |
| 2,874,631 | 2/1959 | Cooksley | 126/9 B |
| 2,999,494 | 9/1961 | Richardson | 126/25 R |
| 3,005,451 | 10/1961 | Richart | 126/9 R |
| 3,306,280 | 2/1967 | Vannoy | 126/25 R |
| 3,487,199 | 12/1969 | Hamlin | 126/25 R |
| 3,606,066 | 9/1971 | Anderson | 126/25 C X |
| 3,611,912 | 10/1971 | Choc | 126/9 R X |
| 3,684,087 | 8/1972 | Anderson | 126/9 A |
| 3,692,013 | 9/1972 | Grafton et al. | 126/25 R |
| 4,158,992 | 6/1979 | Malafouris | 126/9 R |
| 4,203,427 | 5/1980 | Way | 126/25 R |

FOREIGN PATENT DOCUMENTS

| 2905513 | 8/1980 | Fed. Rep. of Germany | 126/9 R |
| 2479676 | 10/1981 | France | 126/9 R |

Primary Examiner—Samuel Scott
Assistant Examiner—Margaret A. Focarino
Attorney, Agent, or Firm—Zarley, McKee, Thomte, Voorhees & Sease

[57] ABSTRACT

The insulated barbeque unit of the present invention is comprised of a cylindrical unit which is formed from two half cylindrical pieces hinged along one of their edges. The unit can fold from a closed position wherein two cylindrical halves are in the formation of a cylinder, to an open position wherein the two cylindrical halves are pivoted 180° with respect to one another. The cylindrical housing of the unit is formed from two spaced apart inner and outer walls which have an insulative material therebetween. The insulative material protects the outer wall of the unit from the heat which is within the unit during the time that the unit is being operated as a barbeque.

7 Claims, 6 Drawing Figures

U.S. Patent        Dec. 6, 1983        4,418,678
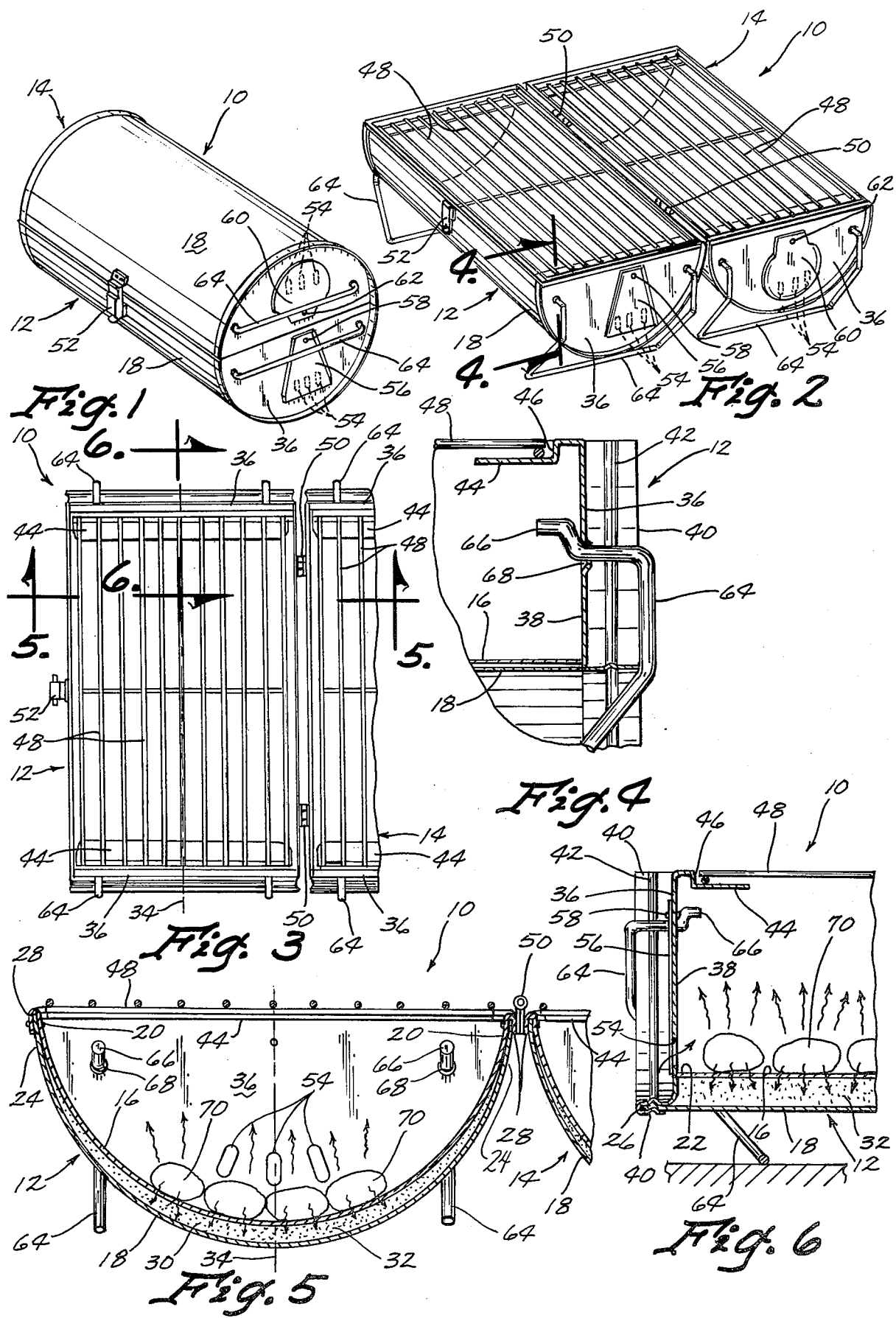

INSULATED BARBEQUE UNIT

BACKGROUND OF THE INVENTION

This invention relates to an insulated barbeque unit. Various types of folding barbeque units have been utilized, and many of these include a painted design on the outer surface thereof. The painted design may be utilized for advertising or for mere decoration.

One problem encountered with these units is that after extended use, the heat from the charcoal within the unit causes the paint on the exterior of the unit to be peeled and to come off. This makes the unit less desirable from the standpoint of either decorating the exterior surface, or from the standpoint of using the exterior surface for advertising.

Therefore, a primary object of the present invention is the provision of an improved barbeque unit having insulated walls therein.

A further object of the present invention is the provision of an insulated barbeque unit which provides the maximum insulation at the point where the maximum heat is located during the time the barbeque unit is being used.

A further object of the present invention is the provision of a barbeque unit which can be easily folded and carried.

A further object of the present invention is the provision of an improved barbeque unit which can be folded into an attractive shape that can be painted on the exterior thereof for advertising or decoration.

A further object of the present invention is the provision of a barbeque unit which is economical to manufacture, durable in use and efficient in operation.

SUMMARY OF THE INVENTION

The present invention utilizes a pair of half cylinders which are hinged along one of their edges so that they can fold from an open position wherein their diameters form a continuous plane to a closed position wherein their diameters are in facing relation and the two cylinder halves together combine to form a circular cylinder.

The cylindrical walls of the present invention are of double thickness, including an inner wall and an outer wall which are separated by an insulative layer. In cross section the insulative layer appears crescent shaped with the widest portion of the crescent being located at the bottom of the half cylinders when the half cylinders are in their unfolded position. Since the charcoal within the units rests adjacent this widest portion of the crescent shaped insulated material, the maximum insulation is applied at the point where the maximum heat is encountered. The insulative material protects the outer surface of the cylinder from the heat of the charcoal within so that the paint on the outer surface will not become peeled or blackened due to the heat from the inside.

The ends of the two cylinder halves are each provided with vent openings and movable covers over the vent openings to provide adjustment thereof. Folding legs are also mounted on the end walls of the device and are adapted to unfold to a position wherein they support the two cylinder halves on a supporting surface when the cylinder halves are opened to their open position.

BRIEF DESCRIPTION OF THE DRAWINGS

FIG. 1 is a perspective view of the present invention in its folded condition.

FIG. 2 is a perspective view of the present invention in its unfolded position.

FIG. 3 is a partial top plan view of the device shown in FIG. 2.

FIG. 4 is a partial sectional view taken along line 4—4 of FIG. 2.

FIG. 5 is a sectional view taken along line 5—5 of FIG. 3.

FIG. 6 is a sectional view taken along line 6—6 of FIG. 3.

DETAILED DESCRIPTION OF THE INVENTION

Referring to the drawings, the numeral 10 generally designates the barbeque unit of the present invention. Unit 10 is comprised of two cylindrical halves 12 and 14. Cylindrical half 12 comprises a rectangular inner wall 16 and a rectangular outer wall 18, both of which are curved into an arcuate surface as shown in the drawings. Inner wall 16 includes a pair of spaced apart side edges 20 and a pair of spaced apart end edges 22 (FIGS. 5-6). Outer wall 18 includes upper side edges 24 and end edges 26. Adjacent the upwardly turned side edges 20 of inner wall 16 are a pair of folded over flanges 28 which are folded over the upper edge 24 of outer wall 18 and which are secured thereto by rivets, welding, crimping or the like. The arc of curvature of inner wall 16 is slightly greater than the arc of curvature of outer wall 18, so that a crescent shaped space 30 is provided therebetween. The crescent shaped space 30 is filled with an insulative material 32 such as vermiculite or the like. The insulative material must be non-combustible. As can be seen in FIG. 5, the widest portion of the crescent shaped space 30 is located at the lowermost portion of the cross-sectional configuration of walls 16, 18, or stated another way, is located along the longitudinal centerline 34 of walls 16, 18.

Enclosing the ends of cylindrical half 14 are a pair of spaced apart half-circular end walls 36. Each end wall 36 includes a vertical portion 38 and an axially extending U-shaped flange 40 which extends along the semicircular edges of end wall 36. U-shaped flange 40 surrounds end edge 26 of outer wall 18 and is attached thereto by a crimped bead 42. The upper horizontal diametric edge of semi-circular end wall 36 is provided with a horizontal flange 44 which includes an axially inwardly presented shoulder 46 therealong. A horizontal grate 48 which is rectangular in shape rests upon the horizontal flanges 44 of end walls 36 and is easily removable by manual upward lifting. Shoulders 46 prevent longitudinal movement of grate 48 with respect to the unit 10.

Cylindrical half 14 is of identical construction to cylindrical half 12, and therefore corresponding parts are identified by the same numerals as used in the foregoing description of cylindrical half 12. A pair of hinges 50 pivotally interconnect the adjacent edges of cylindrical halves 12, 14 so that the cylindrical halves can pivot from a closed position such as shown in FIG. 1, to an open position such as shown in FIG. 2. In the open position, the horizontal grates 48 are in horizontal position and lie in approximately the same plane. A latch mechanism 52 is provided for detachably securing halves 12, 14 in the cylindrical configuration shown in FIG. 1. In this position, the outer walls 18 form a continuous cylindrical surface. One of the end walls of cylinder half 12 is provided with a vent opening 54 (FIG. 6) for providing air venting into the interior of the cylindrical half. A trapezoidal shaped vent cover 56 is superimposed over vent opening 54 and includes a pivotal securement 58 for pivotally securing vent cover 56 over opening 54. End wall 36 of cylinder half 14 is also provided with a vent opening (not shown) similar to vent opening 54, and this vent opening of half 14 is covered by a substantially circular cover plate 60 which is pivotally attached to end wall 36 by means of a rivet 62 or similar securing means. Particular shapes of vent cover 56 and cover plate 60 are chosen for decorative effect, and as can be seen in FIG. 1, these two plates 56, 60 together create the appearance of a typical flip top opening utilized on various types of soft drink and beer cans.

Also mounted to each end wall 36 of cylinder halves 12, 14 is a bent wire leg frame 64 having opposite ends 66 which protrude through holes 68 in end wall 36. When in use, leg frames 64 are in the position shown in FIGS. 2 and 4. However, when it is desired to fold the barbeque unit to the position shown in FIG. 1, legs 64 are forced inwardly through opening 68 so that they are in the position shown in FIG. 1. When the device is moved from the position shown in FIG. 1 to that shown in FIG. 2, the operator merely grasps the exterior portion of each leg frame 64 and pulls it outwardly to the position shown in FIG. 2. The inner ends 66 are bent so as to prevent the leg frame 64 from coming completely outwardly through opening 68.

The outer surfaces 18 of cylindrical halves 12, 14 are insulated from the heat formed by the fire and coals 70 within cylinder halves 12, 14. The insulative material 32 within the crescent shaped space or cavity 30 provides this insulative effect. Consequently, the outer surface 18 may be painted either for decoration or for to display advertising on the outer surface of the device. The device is compact and can be folded easily. It is sturdy, simple in construction, attractive in appearance and efficient in operation.

Thus, it can be seen that the device accomplishes at least all of its stated objectives.

What is claimed is:

1. A barbeque unit comprising:
   a rectangular inner wall having opposite side edges and opposite end edges, said inner wall being curved so that said side edges are presented upwardly, thereby forming an upwardly presented concave surface and a downwardly presented convex surface;
   a rectangular outer wall having opposite side edges and opposite end edges, said side edges of said outer wall being curved upwardly so that said outer wall forms an upwardly presented concave surface and a downwardly presented convex surface;
   an inner end connecting means joining said upper edges of said inner and outer walls and holding said inner and outer walls together in nested relationship with at least a portion of said convex surface of said inner wall being spaced from at least a portion of said concave surface of said outer wall to define a cavity therebetween;
   grate means extending between said opposite edges of said inner and outer walls and bridging across and above said upwardly presented concave surface of said inner member;
   a pair of spaced apart end walls each extending in a plane perpendicular to said inner and outer walls and each being joined to one of said end edges of said inner and outer walls;
   heat insulating material filling said cavity whereby heat from coals resting on said concave surface of said inner wall will be substantially insulated from said outer wall,
   said concave surface of said outer wall forming one-half of a circular cylinder and said end walls being shaped in a semi-circle and forming the axial ends of said one half of said circular cylinder, and
   a second outer wall forming a second half cylinder indentical to said first half cylinder formed by said first mentioned outer wall, a second pair of endwalls being joined to said second outer wall to form axial ends of said second half cylinder, hinge means interconnecting one of said edges of said first outer wall to one of said edges of said second outer wall to permit said first and second cylinder halves to pivot about a horizontal axis therebetween from a joined position wherein said first and second half cylinders form a complete circular cylinder to a spread position approximately 180° therefrom.

2. A barbeque unit according to claim 1 and further comprising at least one vent hole in at least one of said end walls for providing communication of air from outside said barbeque unit through said one end wall to coals resting on said upper concave surface of said inner wall.

3. A barbeque unit according to claim 2 wherein said side edges of said inner wall each touch one of said side edges of said outer wall, the spaced apart distance between said inner and outer walls being greatest adjacent the longitudinal centerline of said inner and outer walls and becoming progressively less commencing at said centerline and continuing in opposite directions therefrom.

4. A barbeque unit according to claim 3 wherein said inner wall is curved at a first radius of curvature and said outer wall is curved at a second radius of curvature which is less than said first radius of curvature.

5. A barbeque unit according to claim 4 wherein leg means are movably attached to said end walls of said first and second half cylinders, said leg means being movable from a folded position to an unfolded position for supporting said half cylinders on a supporting surface when said half cylinders are in said spread position.

6. A barbeque unit according to claim 5 wherein latch means are connected to said first and second half cylinders for detachably latching said half cylinders together when said cylinders are in said joined position.

7. A barbeque unit comprising:
   a rectangular inner wall having opposite side edges and opposite end edges, said inner wall being curved at a first radius of curvature so that said side edges are presented upwardly, thereby forming an upwardly presented concave surface and a downwardly presented convex surface;
   a rectangular outer wall having opposite side edges and opposite end edges, said side edges of said outer wall being curved upwardly at a second radius of curvature which is less than said first radius of curvature so that said outer wall forms an upwardly presented concave surface and a downwardly presented convex surface;

an inner end connecting means joining said upper edges of said inner and outer walls and holding said inner and outer walls together in nesting relationship with at least a portion of said convex surface of said inner wall being spaced from at least a portion of said concave surface of said outer wall to define a cavity therebetween;

grate means extending between said opposite edges of said inner and outer walls and bridging across and above said upwardly presented concave surface of said inner member;

a pair of spaced apart end walls each extending in a plane perpendicular to said inner and outer walls and each being joined to one of said end edges of said inner and outer walls to define a fire chamber within said barbeque unit;

heat insulating material filling said cavity whereby heat from coals resting on said concave surface of said inner wall will be substantially insulated from said outer wall, and leg means retractably attached to each of said end walls and being slideable from a first inoperative position within said fire chamber to a second operative position for supporting barbeque unit above a supporting surface.

* * * * *